United States Patent [19]

Johnstone et al.

[11] Patent Number: 4,649,008
[45] Date of Patent: Mar. 10, 1987

[54] METHOD OF MAKING INTERLOCKING VINYL SIDING

[75] Inventors: Thomas O. Johnstone, Cortland, Ohio; Thomas W. Dawe, Clark, N.J.

[73] Assignee: Alcan Aluminum Corp., Cleveland, Ohio

[21] Appl. No.: 580,569

[22] Filed: Feb. 16, 1984

[51] Int. Cl.[4] ............................................. B29C 53/04
[52] U.S. Cl. .............................. 264/177.1; 264/178 R;
264/210.2; 264/284; 264/285; 264/295;
264/322; 425/325; 425/388
[58] Field of Search .................. 264/177 R, 151, 295,
264/178 r, 284, 285, 210.2, 562, 339, 571;
425/388

[56] References Cited

U.S. PATENT DOCUMENTS

| | | | |
|---|---|---|---|
| 3,281,516 | 10/1966 | Southwick | 264/285 |
| 3,454,693 | 7/1969 | Crenshaw | 264/285 |
| 3,622,418 | 11/1971 | Black et al. | 264/339 |
| 3,776,672 | 12/1973 | Heilmayr | 264/339 |
| 3,886,250 | 5/1975 | Danko | 264/177 R |
| 4,096,011 | 6/1978 | Sanders et al. | 264/295 |
| 4,247,506 | 1/1981 | Summers | 264/177 R |
| 4,329,307 | 5/1982 | Westcott et al. | 264/285 |
| 4,352,771 | 10/1982 | Szabo | 425/388 |

FOREIGN PATENT DOCUMENTS 58-22148  2/1983  Japan ............... 264/177 R

Primary Examiner—Jeffery Thurlow
Attorney, Agent, or Firm—Renner, Otto, Boisselle & Lyon

[57] ABSTRACT

Interlocking vinyl siding panels are formed from vinyl sheets. A sheet of vinyl is extruded with a V-shaped bend along one of its edges, and a Z-shaped bend intermediate its edges. The extruded sheet of vinyl is then formed, while in a hot, semi-viscous state into the final siding profile. As the siding profile is formed, the V-shaped bend is formed into a first locking profile and the Z-shaped bend is formed into a second locking profile. The first locking profile is dimensioned for a snap-type engagement with the second locking profile of another similarly formed siding member.

11 Claims, 6 Drawing Figures

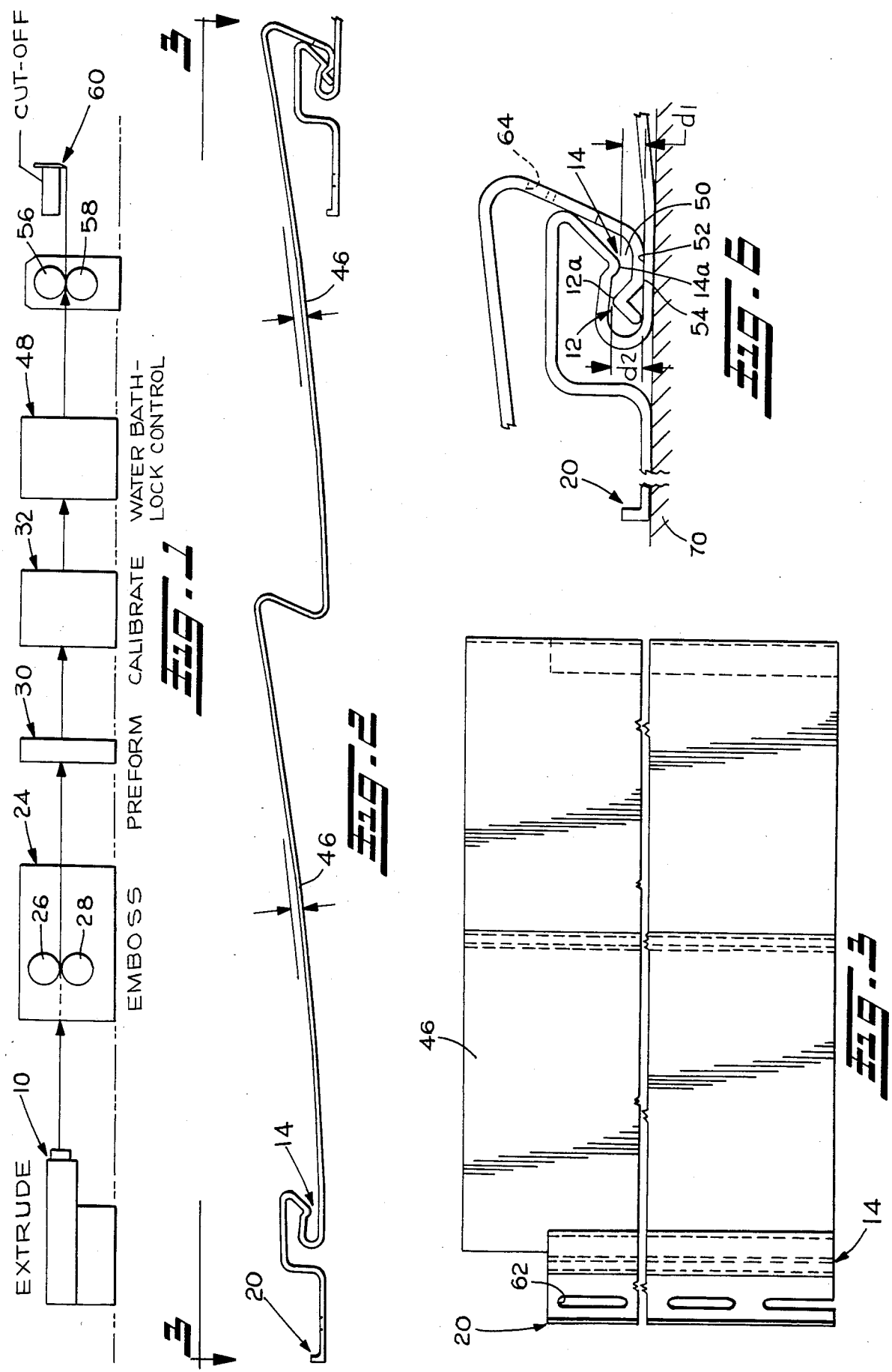

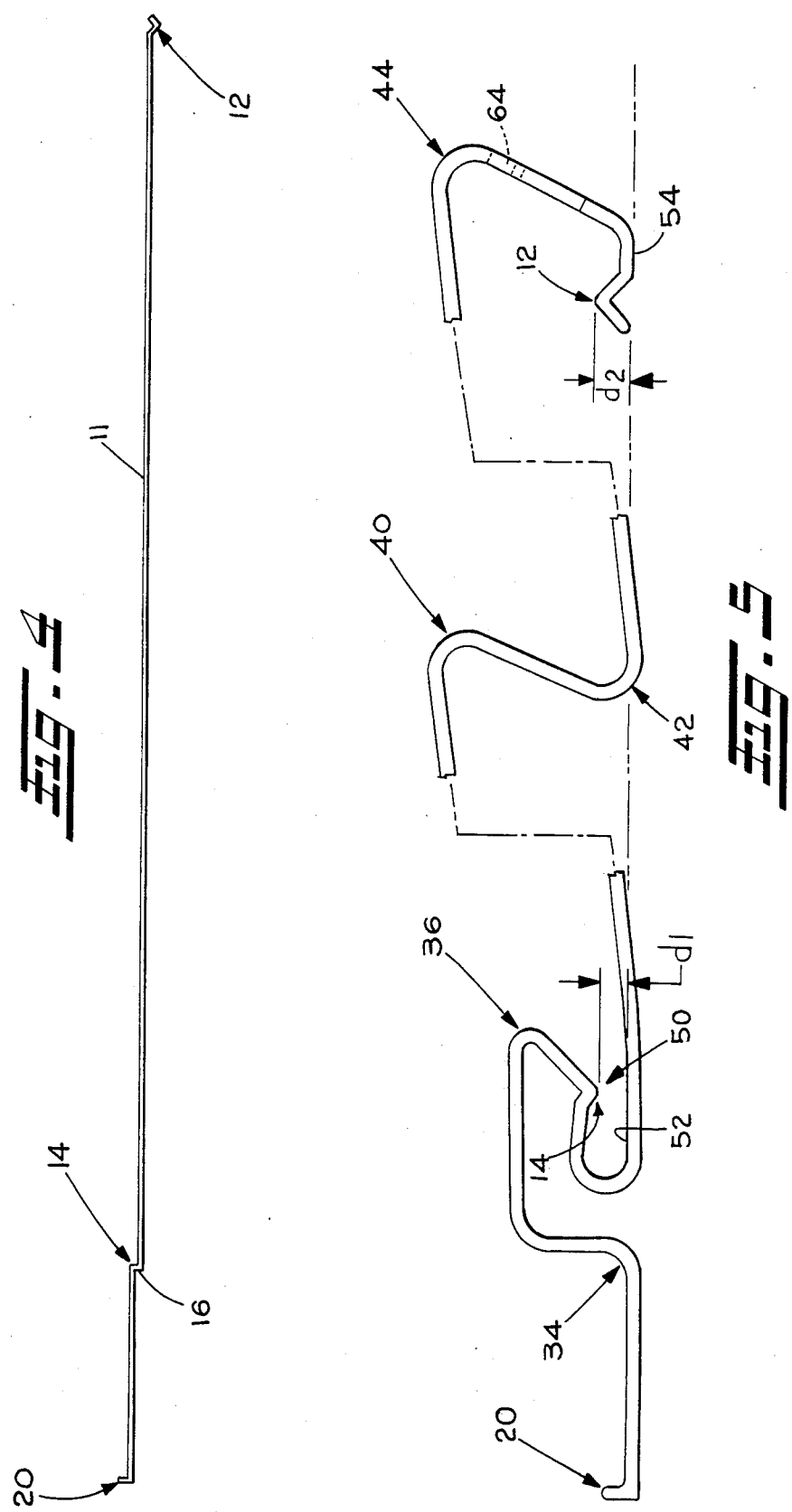

METHOD OF MAKING INTERLOCKING VINYL SIDING

BACKGROUND OF THE INVENTION

The present invention relates to interlocking vinyl siding panels, and to a method of forming the vinyl siding panels. It relates particularly to post formed vinyl siding panels which can be engaged with each other in a positive, snap-type interlock when they are applied to a builing.

Vinyl siding panels are widely used for protecting the exterior walls of buildings, as well as for enhancing the exterior appearance of buildings. The siding panels may have different profiles and exterior finishes, to provide variety in the exterior appearance they can provide to a building. Typically, the siding panels are nailed or otherwise secured to the building to fix them in place.

Formerly, in constructing vinyl siding panels, it was customary to extrude a sheet of vinyl with the entire profile formed therein, and to then cut the sheet of vinyl into panels of appropriate lengths. However, in recent years the vinyl siding industry has been converting from extruded vinyl siding to what is known as "post formed" vinyl siding. Post formed vinyl siding is formed by initially extruding a flat sheet of vinyl, and then forming the sheet of vinyl against or through a die and into its final profile while the vinyl is still in a hot, semi-viscous state. Post forming the vinyl produces a siding with (i) larger radii at the bends and folds than 100% extruded siding, and (ii) more resilience than 100% extruded siding. Thus, post formed siding is generally more damage resistant than 100 percent extruded vinyl siding, i.e. post formed siding does not crack as easily during installation, thermal cycling, impact, etc.

However, in changing from extruded vinyl siding to post formed vinyl siding one problem that has been encountered is the difficulty of providing a positive interlock between adjacent siding panels. The ability to positively interlock a pair of adjacent siding panels is important to the construction industry, because it simplifies the application of the siding panels to a building. Specifically, once one panel has been nailed to a building a subsequent panel can be attached to the building by a single installer, by relying on the interlock to hold the entire length of the panel in place while the installer nails it in place. If a positive interlock is not achieved, two installers are generally necessary to apply each panel to the building. It has been found that with post formed vinyl siding it is difficult to provide the siding panels a good interlocking siding profile. Many post formed vinyl siding panels rely on a friction fit to interlock with each other. However, due to difficulties in maintaining dimensional tolerances, vinyl panels that rely on a friction fit are often subject to slippage. This makes the application of the panels to a building cumbersome, because two installers are necessary to apply each panel to the building.

SUMMARY OF THE INVENTION

The present invention provides vinyl siding panels which can positively interlock with each other when applied to a building, and which also have the damage resistance which is generally produced in siding made by post forming techniques.

According to the present invention, the vinyl siding is formed by extruding a sheet of vinyl with portions of locking profiles formed therein, and then post forming the extruded sheet into the final siding profile. Extruding the vinyl sheet with portions of the locking profiles therein, and then post forming the remainder of the siding, produces siding panels that can effectively interlock with each other but yet retain the damage resistance normally associated with post formed panels. With the positive interlock, assembly of a plurality of a panels to cover the side of a building is greatly facilitated. Specifically, a post formed panel can be retained against a building by its positive, snap type interlock with a previously installed panel, and the panel can be nailed in place by a single installer, without danger of the panel separating from the previously installed panel.

In the preferred embodiment, vinyl siding is produced by extruding a sheet of vinyl with special bends that form parts of the locking profile of the siding. One of the bends is a V-shaped bend formed along one of the edges of the sheet of vinyl. The other bend is a stepped, or Z-shaped, bend formed intermediate the edges of the sheet of vinyl. The extruded sheet of vinyl, with the foregoing bends therein, is then post formed into its final siding profile. During the post forming, the V-shaped bend is formed into a first locking profile. Further, the Z-shaped bend is formed into a second locking profile. The second locking profile is dimensioned to have a snap type interlock with the V-shaped first locking profile disposed in a similarly formed siding panel. Thus, in assembling siding panels against a building, the first locking profile in one siding panel can have a snap-type interlocking engagement with the second locking profile in another siding panel, to provide a positive interlock between the siding panels.

Accordingly, it is the basic object of this invention to provide vinyl siding panels that can engage each other in a positive interlock, and which siding panels possess the damage resistance that is normally associated with post formed panels.

The further objects and advantages of the present invention will become further apparent from the following detailed description taken with reference to the accompanying drawings.

DESCRIPTION OF THE DRAWINGS

In the annexed drawings:

FIG. 1 is a schematic illustration of the basic steps used in forming a siding panel according to the prinicples of this invention;

FIG. 2 is a view of the profile of a siding panel constructed according to the principles of this invention, with a fragmentary portion of another siding panel interlocked therewith;

FIG. 3 is a fragmentary view of the front of the siding panel of FIG. 2, on a reduced scale, taken from the direction 3—3;

FIG. 4 is a view of the profile of a sheet of extruded vinyl material used in forming a siding panel according to the principles of this invention;

FIG. 5 is an enlarged, fragmentary view of the profile of a siding panel formed according to the prinicples of this invention; and FIG. 6 is a fragmentary, schematic illustration of the interlock between a pair of siding panels formed according to the principles of this invention.

DETAILED DESCRIPTION OF THE PREFERRED EMBODIMENT

In forming a vinyl siding panel according to the principles of this invention, hot vinyl material is initially extruded into a sheet that includes special bends which form portions of the locking profiles for the siding panel. The extruded sheet of vinyl, while in a hot, semi-viscous state, is then post formed into the final siding profile. In post forming the sheet of vinyl into its final profile, the extruded bends are formed into locking profiles. The sheet of vinyl is then cut into panels, each of which has the locking profiles therein. The locking profiles are dimensioned so that a pair of the siding panels can have a positive snap-type interlock with each other when they are applied to a building.

In this application, reference to a sheet of vinyl material as having a "bend" or a "bent position" is intended to mean that the sheet of vinyl material has a portion that is configured to extend out of the plane of the sheet of vinyl material. The terms "bend" or "bent position" define the configuration of the portion of the vinyl, and not the manner in which the portion of the vinyl is formed, unless explicitly stated herein. Also, reference to a "snap-type engagement" or "snap-type interlock" between a pair of siding panels means a connection in which a resilient snap type action retains the panels together, but which may allow the panels some relative range of movement relative to each other even though they are retained together.

As seen from FIG. 1, in forming a vinyl siding panel according to the invention, a sheet of vinyl is initially extruded, in an extruder 10. The vinyl material used in the extruder 10 preferably comprises a blend of polyvinylchloride (PVC) with additives such as, pigment, heat stabilizer, light stabilizer, and lubricant (e.g. wax).

In the extruder 10, the vinyl material is extruded through a die configured with the profile shown in FIG. 4, so that the sheet of vinyl material that is extruded has the profile shown in FIG. 4. The extruded sheet of vinyl has a planar, main body portion 11. The extruded sheet of vinyl material has a V-shaped bend 12 extending out of the planar main body portion 11, along one of its edges. Further, at a location intermediate its edges, the extruded sheet of vinyl has a stepped, or Z-shaped, bend 14. In the Z-shaped bend 14, a wall 16 preferably extends perpendicular to the planar main body portion 11 of the extruded sheet. However, reference to a "Z-shaped" bend also encompasses a profile in which the wall 16 extends at an acute angle to the plane of the main body portion 11 of the extruded sheet. The Z-shaped bend 14 extends out of the plane of the main body portion 11 in the opposite direction from the V-shaped bend 12.

Along its other edge, the extruded sheet of vinyl has an L-shaped bend 20. In a siding panel, the V-shaped bend 12 the Z-shaped bend 14 are configured to form the locking profiles for the siding panel. The L-shaped bend 20 is used to provide rigidity to the siding panel.

According to the preferred embodiment, the sheet of vinyl preferably leaves the extruder 10 in a semi-viscous state, at a temperature of about 350° F. However, the exact temperature may vary according to the particular materials (e.g. pigment, heat stabilizers, light stabilizers, lubricant) used in the vinyl, as will be readily apparent to those of ordinary skill in the art.

After the specially formed, semi-viscous sheet of vinyl leaves the extruder 10, it is drawn into an embosser 24. The embosser 24 includes a pair of rolls 26, 28 that draw the sheet of vinyl from the extruder 10, while maintaining the sheet of vinyl under tension. The roll 26 is preferably formed of steel, and the roll 28 is preferably formed of rubber. As they draw the sheet of vinyl from the extruder 10 the rolls 26, 28 emboss the surface configuration, or ornamentation, onto the sheet of vinyl. Further, the rolls 26, 28 apply tension to the sheet of vinyl to neck the sheet of vinyl down to a particular dimension. Of course, the amount of necking down of the sheet of vinyl can vary, depending on the amount of tension applied by the rolls 26, 28, as will be readily apparent to those of ordinary skill in the art.

After leaving the embosser 10, and while still in a hot semi-viscous state, the sheet of vinyl is drawn through a preform die 30. In the preform die 30, the hot, semi-viscous sheet of vinyl is preformed into a rough version of its final profile. Preferably, the preform die 30 has the rough profile of the siding formed therein. Further, according to the preferred embodiment, the preform die actually comprises a pair of steel plates extending transverse to the direction of movement of the sheet of vinyl. Each steel plate has a respective half of the rough siding profile. With this construction, the steel plates can be moved toward and away from each other to control the contour of the rough profile.

After leaving the preform die 30, the sheet of vinyl material, while still in a hot, semi-viscous state, is directed through a calibrator 32. In the calibrator 32, the roughed out siding profile is formed into its final shape. The calibrator 32 has walls that are dimensioned to correspond to the final siding profile. Vacuum drawing means are provided in the calibrator, and extend about the entire siding profile defined by the calibrator. Thus, in the calibrator 32, a vacuum can be drawn at any location about the profile defined by the calibrator. The vacuum is applied to the vinyl material, at selected points about its periphery, to draw the vinyl material against the walls of the calibrator and into its final shape. For example, as seen in FIG. 5, the final profile of the siding has a number of curves (e.g. curves 34, 36, 38, 40, 42, 44) that are formed with respective radii. In the calibrator, the vacuum draws the vinyl material against its walls, to properly dimension the curves shown in FIG. 5. Moreover, the vacuum is used in the calibrator to draw the wide parts of the siding into the gently curved walls shown at 46 in FIG. 2.

Also, in the calibrator 32, water injection means are provided about the entire siding profile defined by the calibrator. The water injection means are generally interspersed with the vacuum drawing means. The injection means allow water to be injected at selected portions of the siding profile to cool those portions of the siding profile, thereby helping set up specific curves formed in the siding profile. Moreover, the water acts as a lubricant and must be continuously replenished because it is drawn off by the vacuum drawing means.

The vinyl material leaving the calibrator 32, has the profile shown in FIG. 5. Specifically, the Z-shaped bend 14 is formed into a loop 50, with the apex 14a of the Z-shaped bend 14 facing a surface 52 of the sheet of siding. The area within the loop 50, between the apex 14a of the Z-shaped bend 14 and the surface 52 of the sheet of vinyl, defines a retaining or locking profile. The edge of the sheet of vinyl having the V-shaped bend 12 is formed so that the V-shaped bend 12 extends away from a base surface 54 and defines another locking profile. The spacing $d_1$ between the apex 14a of the Z- shaped bend 14 and the surface 52 of the siding member defines an opening that is less than the "height" of the V-shaped bend, i.e. the dimension $d_2$ between the apex 12a of the V-shaped bend 12 and the base surface 54. Thus, with a pair of similar siding panels having the profile of FIG. 5, the V-shaped bend 12 on one siding panel can have a snap type interlock with the retaining profile on another siding panel to interlock the pair of siding panels.

After leaving the calibrator 32, the vinyl siding material is drawn through a water bath 48. In the water bath 48, final lock or dimensional control of the siding is provided. Specifically, the water bath effects cooling and set up of the vinyl, and while the vinyl is immersed in the water bath, a shim is inserted between the apex 14a of the Z-shaped bend 14 and the surface 52 of the siding. The shim maintains a specific precise dimensional control between those surfaces. The water bath, which is preferably maintained at about 90°–140° F., helps set up the siding in its predetermined final profile. To help draw the siding through the water bath 48 and through the forming and calibrating stages, a pair of rubber rolls 56, 58 are provided downstream of the water bath 48.

Finally, downstream of the rubber rollers 56, 58, there is a cutoff mechanism 60. In the cutoff mechanism 60 the siding is cut to the appropriate lengths to form siding panels. The cutoff siding panels would all have the profile shown in FIG. 5.

FIG. 6 specifically illustrates the manner in which a pair of siding panels found according to the present invention interlock, when they are applied to a building. In FIG. 6 a building wall is schematically illustrated at 70. The building wall would normally extend vertically, as will be readily appreciated by those of ordinary skill in the art. As discussed above, the distance $d_1$ between a Z-shaped bend 14 and the surface 52 on one panel is less than the height $d_2$ of the V-shaped bend 12 of a similar siding panel. When applying a pair of siding panels to a building 70, one siding panel is applied to the building wall with its L-shaped bend 20 uppermost. This means that the retaining profile 50 is disposed near the top most end of the siding panel, and faces in a downward direction. Further, it means that the V-shaped locking portion 12 is disposed at the bottom of the siding panel. In order to secure a second siding panel to that panel, the second siding panel is also oriented with its L-shaped bend 20 uppermost, so that its V-shaped locking portion 12 can have a snap-type interlock with the retaining profile 50 of the first siding panel. The panels can then have a positive, snap-type interlock, as shown in FIG. 6.

The forming of siding panels in the foregoing manner can be accomplished in a rapid and space efficient manner. The siding can be run through the various stages described above at a rate of about 30 feet per minute and the entire operation described above can be performed in a distance of about 4 feet. Thus, a siding panel can be fabricated in about 8 seconds. Further, during the fabricating process, the siding panels can be formed with nail slots 62 (FIG. 3), weep holes 64 (FIG. 5) or any other features that are commonly found in vinyl siding.

In the foregoing disclosure, applicants have illustrated how the prinicples of this invention can be used to form one type of final siding profile. Of course, there are numerous other types of siding profiles that are well known in the building industry, and which can be adapted to innerlock with each other using the principles of this invention. The manner in which the principles of this invention can be used to form other types of siding profiles will be readily apparent to those of ordinary skill in the art.

We claim:

1. A method of forming a vinyl sliding member having first and second locking profiles dimensioned so that the first locking profile can have a snap-fit interlock with the second locking profile on a similar siding member when said siding members are installed in parallel relation on a building, comprising the steps of extruding a sheet of vinyl with a first bent portion adjacent one of its edges and a second bent portion intermediate its edges, and thereafter forming the extruded sheet of vinyl into a siding profile, the forming of the extruded sheet of vinyl into the siding profile including the steps of (i) bending the end of the extruded sheet of vinyl having the first bent portion into a first locking profile which incorporates the first bent portion and (ii) bending the intermediate portion of the sheet of vinyl having the second bent portion into a second locking profile which incorporates the second bent portion, the second locking profile being dimensioned to have a snap-fit interlock with the first locking profile of a similarly formed siding member which interlock is provided by contact between said first bent portion and said second bent portion during installation.

2. A method as set forth in claim 1 wherein the step of extruding the sheet of vinyl comprises extruding a substantially planar sheet of the vinyl material with a V-shaped bend along one of its edges to form the first bent portion and a Z-shaped bend intermediate its edges to form the second bent portion, the bending of the vinyl into the siding profile comprising (i) bending the V-shaped bend along the one edge into the first locking profile and (ii) forming an intermediate portion of the siding into a loop with an apex of the Z-shaped bend facing a surface of the siding to define an opening in the second locking profile, the height of the V-shaped bend of the first locking profile being greater than the opening in the second locking profile, so that the first locking profile of one siding member can have a snap-type engagement with the second locking profile of another similarly formed siding member.

3. A method as set forth in claim 2 wherein the step of extruding the sheet of vinyl comprises extruding a planar main body portion with the V and Z-shaped bends extending in opposite directions out of the plane of the main body portion.

4. A method as set forth in claim 3 including the step of extruding the sheet of vinyl with an L-shaped bend formed at the edge that is opposite to the edge the V-shaped bend is formed in.

5. A method as set forth in claim 3 wherein the forming of the vinyl into its final profile causes the apexes of the V-shaped and Z-shaped bends to face in opposite directions.

6. A method as set forth in claim 3 wherein the sheet of vinyl is in a hot, semi-viscous state after being extruded, and the step of forming the extruded sheet of vinyl into the siding profile comprises the step of bending the sheet of vinyl against die means while the sheet of vinyl is still in a hot, semi-viscous state, the bending of the sheet of vinyl against the die means including bending the V-shaped bend into tne first locking profile, and bending the Z-shaped bend into the second locking profile.

7. A method as set forth in claim 6 wherein the step of bending the extruded sheet of vinyl against the die means comprises bending the extruded sheet against a first die to bend the extruded sheet into a rough siding profile, and bending the extruded sheet against a second die to form the extruded sheet into a final siding profile.

8. A method as set forth in claim 7 including cooling the sheet of vinyl after it is in its final siding profile to cause the final siding profile to be retained in the vinyl material.

9. A method as set forth in claim 1 wherein the sheet of vinyl is in a hot semi-viscous state after bing extruded, and the step of forming the extruded sheet of vinyl into the siding profile comprises the step of bending the sheet of vinyl against die means while the sheet of vinyl is still in a hot semi-viscous state, the bending of the sheet of vinyl against the die means bending the first bent portion into the first locking profile, and bending the second bent portion into the second locking profile.

10. A method as set forth in claim 9 wherein the step of bending the extruded sheet of vinyl against the die means comprises bending the extruded sheet against a first die to bend the extruded sheet into a rough siding profile, and bending the extruded sheet against a second die to bend the extruded sheet into a final siding profile.

11. A method as set forth in claim 10 including cooling the sheet of vinyl after it is in its final siding profile to cause the final siding profile to be maintained in the vinyl material.

* * * * *